(12) United States Patent
Brar

(10) Patent No.: US 9,396,428 B2
(45) Date of Patent: Jul. 19, 2016

(54) METHOD FOR ANCHORING A LINEAR INDUCTION GENERATOR TO LIVING TISSUE FOR RFID SIGNAL TRANSMISSION

(71) Applicant: Gurbinder S Brar, Castro Valley, CA (US)

(72) Inventor: Gurbinder S Brar, Castro Valley, CA (US)

(*) Notice: Subject to any disclaimer, the term of this patent is extended or adjusted under 35 U.S.C. 154(b) by 0 days.

(21) Appl. No.: 14/517,635

(22) Filed: Oct. 17, 2014

(65) Prior Publication Data

US 2015/0129664 A1     May 14, 2015

Related U.S. Application Data

(60) Provisional application No. 61/894,893, filed on Oct. 23, 2013, provisional application No. 61/901,649, filed on Nov. 8, 2013.

(51) Int. Cl.
*G06K 7/08*   (2006.01)
*G06K 19/06*  (2006.01)
*G06K 19/077* (2006.01)

(52) U.S. Cl.
CPC .... *G06K 19/07749* (2013.01); *G06K 19/07758* (2013.01); *Y10T 29/4902* (2015.01); *Y10T 29/49018* (2015.01)

(58) Field of Classification Search
USPC ................................................ 235/451, 492
See application file for complete search history.

(56) References Cited

U.S. PATENT DOCUMENTS

| | | | |
|---|---|---|---|
| 3,206,768 A * | 9/1965 | Preston ................... | A61M 1/10 623/3.28 |
| 5,482,008 A * | 1/1996 | Stafford ................. | G01V 15/00 119/174 |
| 6,130,612 A * | 10/2000 | Castellano et al. ........ | 340/572.6 |
| 6,254,548 B1 * | 7/2001 | Ishikawa et al. .............. | 600/549 |
| 6,346,884 B1 * | 2/2002 | Uozumi et al. ............ | 340/572.1 |
| 7,989,971 B2 | 8/2011 | Lemieux | |
| 8,260,201 B2 | 9/2012 | Rossman et al. | |
| 8,330,298 B2 | 12/2012 | Scherbenski et al. | |
| 2003/0193445 A1 * | 10/2003 | Mejia ....................... | H01Q 1/22 343/867 |
| 2005/0261563 A1 * | 11/2005 | Zhou .................... | A61B 5/0031 600/347 |
| 2007/0107766 A1 | 5/2007 | Langley et al. | |
| 2007/0229279 A1 * | 10/2007 | Yamazaki et al. ......... | 340/572.7 |
| 2009/0209804 A1 * | 8/2009 | Seiler et al. ....................... | 600/7 |
| 2009/0219139 A1 * | 9/2009 | Slesinski ................... | F03G 7/08 340/10.1 |
| 2009/0315680 A1 * | 12/2009 | Arimura ...................... | 340/10.1 |
| 2010/0161004 A1 * | 6/2010 | Najafi ................... | A61N 1/3787 607/60 |
| 2012/0162057 A1 * | 6/2012 | Tan ......................... | G06F 3/011 345/156 |

FOREIGN PATENT DOCUMENTS

WO    WO 2011092074 A1 *  8/2011

* cited by examiner

*Primary Examiner* — Tuyen K Vo
(74) *Attorney, Agent, or Firm* — R Anteo & Tormey PC; Pete Tormey

(57) ABSTRACT

Disclosed herein are systems and methods for an implantable device comprising a ferromagnetic mass at least partially disposed near a coil, said coil formed of electrically conducting material and having electrical leads, a resonator circuit coupled to the leads and operable to resonate on application of energy from said leads. Some embodiments include an antenna coupled to said resonator circuit, wherein when either the ferromagnetic mass or the coil moves, power is supplied to the resonator circuit. In certain embodiments the device further includes a modulator coupled to said resonator circuit and operable to modulate the output of the resonator circuit where either the ferromagnetic mass or the coil is disposed in an animal such as a human. some embodiments allow for disposing multiple devices in an animal for characterizing different animal motions.

11 Claims, 3 Drawing Sheets

METHOD FOR ANCHORING A LINEAR INDUCTION GENERATOR TO LIVING TISSUE FOR RFID SIGNAL TRANSMISSION

PRIORITY

This application claims the benefit of provisional patent applications 61/894,893, filed Oct. 23, 2013 and 61/901,649 filed Nov. 8, 2013 by the same inventor.

BACKGROUND

RFID Systems

Radio frequency identification ("RFID") tags may be manufactured as passive, active, or battery assisted passive ("BAP") devices. Active tags have on-board batteries and periodically transmit their ID signals without interrogation, whereas a battery-assisted passive device may have a small battery on board and is activated when interrogated by an RFID reader. Conventionally passive tags are less expensive and smaller because there is no battery.

In conventional systems passive RFID must be interrogated (or illuminated) with a power level roughly three magnitudes stronger than the desired output signal to initiate operation of the device. The strength of the desired output signal is important for managing interference in certain environments; therefore battery assistance may be crucial in certain applications.

For specific identification purposes, the tags may either be read-only, have a factory-assigned serial number, or they may be read/write, where a unique ID may be written into the tag by a user. Field programmable tags may have the ability to be written to once and then read multiple times.

RFID tag systems conventionally contain at least two parts: an integrated circuit for processing a radio-frequency (RF) signal and an antenna for receiving and transmitting the signal. In operation an RFID reader transmits an encoded radio signal to interrogate the tag. The RFID tag receives the message and then responds with its identification and other information. The responses range from simply a unique tag serial number to product-related information such as a stock number, lot or batch number, production date, or other specific information.

RFID tag systems may operate in a wide RF range, with several designated frequency ranges set aside for RFID operation across the radio spectrum. For example and without limitation, RFID tags for tracking animals often operate in the 120-150 KHz range while microwave versions of RFID systems can be found in WLAN or Bluetooth operations.

Power Generation

Mechanical energy is manifested in the bodies of humans and animals as a result of their physical processes. Such physical processes include both voluntary and involuntary muscle movements. It is sometimes desirable to convert mechanical energy to electrical energy. An example is the conversion of kinetic energy into electrical energy as the kinetic energy of a mass moves in a magnetic field relative to a conductive coil thereby converting the kinetic energy of the mass to electrical energy by through electromagnetic induction. A magnet moving axially through the center of a coil will induce a voltage across the coil terminals. The voltage is induced because it is the result of the changing magnetic flux on the coil.

One conventional application of this is in shaker flashlights, where the flashlight is vigorously shaken back and forth, causing a magnet to move through a multi-turn coil, which provides charge to a battery. The exact amount of power derived from this system will depend on the characteristics of the coil and magnet and together with the amount of motion induced onto the system.

SUMMARY

Disclosed herein are systems and methods for an implantable device comprising a ferromagnetic mass at least partially disposed in a coil, said coil formed of electrically conducting material and having a two leads, a resonator circuit coupled to said leads and operable to resonate on application of energy from said leads, an antenna coupled to said resonator circuit, wherein when either the ferromagnetic mass or the coil moves, power is supplied to the resonator circuit. In certain embodiments the device further includes a modulator coupled to said resonator circuit and operable to modulate the output of the resonator circuit where either the ferromagnetic mass or the coil is disposed in an animal such as a human. some embodiments allow for disposing multiple devices in an animal for characterizing different animal motions.

The construction and method of operation of the invention, however, together with additional objectives and advantages thereof will be best understood from the following description of specific embodiments when read in connection with the accompanying drawings.

DESCRIPTION

Generality of Invention

Figure 1:
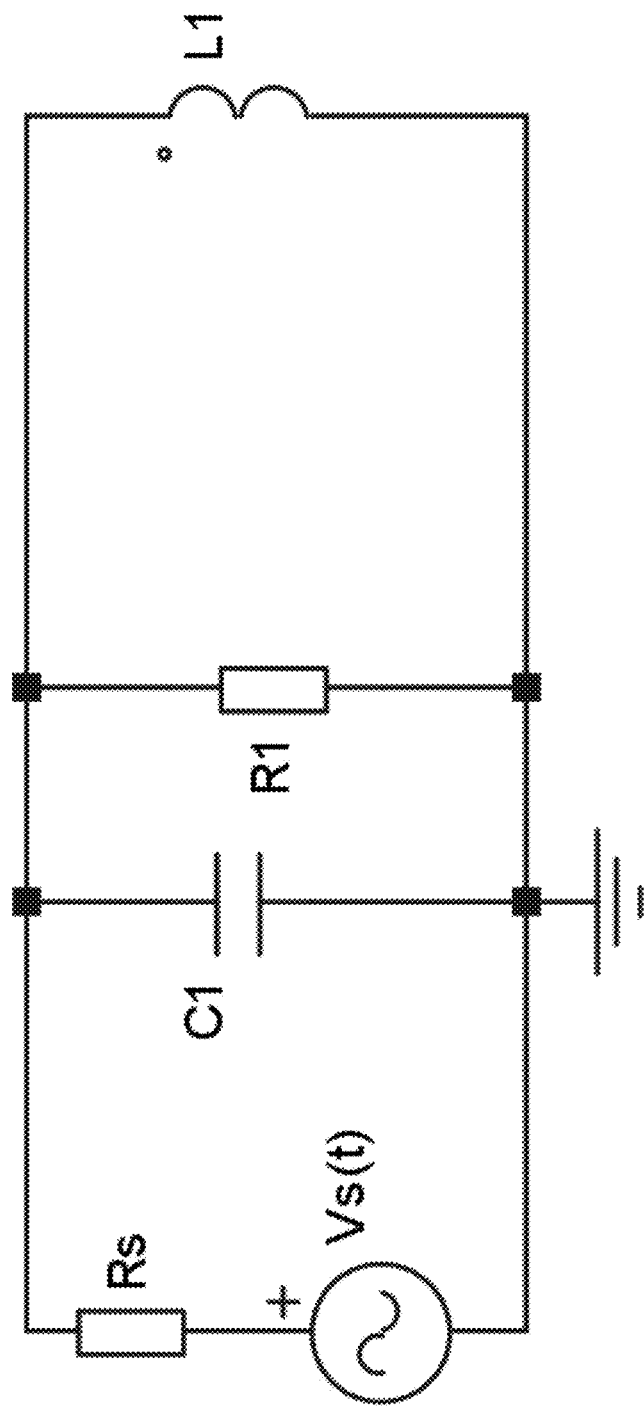
FIG. 1 shows an electronic equivalent schematic circuit for an active RFID circuit.

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

Lexicography

As used in this disclosure, "electromagnetically active" refers to a mass that is capable of affecting a magnetic field. Electromagnetically active components include, but are not limited to, permanent magnets, electromagnets, inductors, and materials having magnetic permeability. Magnetic materials may include nickel-iron alloys with a percentage of one or more of silicon, molybdenum, or copper.

DETAILED DESCRIPTION

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

System Elements

Equivalent Circuit Diagram

FIG. 1 shows an electronic equivalent circuit for an active RFID circuit. The basic Active RFID tag equivalent circuit includes a capacitor (C1), resistor (R), and inductance (L) in parallel with power supply (Vs). The power supply Vs may be either alternating current or direct current and contain a parasitic resistance (Rs). By way of example only, the voltage source and parasitic resistance are depicted parallel to all other active RFID tag elements. The inductance L may be from an RFID antenna circuit. The inductance L. capacitance C and resistance R may be dependent on the specified operating frequency. Different elements including the inductance L, when formed as part of an antenna circuit, may comprise one or more relatively thin traces of conductive material etched or otherwise disposed on a surface. In some embodiments the surface may be a flexible substrate.

References in the specification to "one embodiment", "an embodiment", "an example embodiment", etc., indicate that the embodiment described may include a particular feature, structure or characteristic, but every embodiment may not necessarily include the particular feature, structure or characteristic. Moreover, such phrases are not necessarily referring to the same embodiment. Further, when a particular feature, structure or characteristic is described in connection with an embodiment, it is submitted that it is within the knowledge of one of ordinary skill in the art to effect such feature, structure or characteristic in connection with other embodiments whether or not explicitly described. Parts of the description are presented using terminology commonly employed by those of ordinary skill in the art to convey the substance of their work to others of ordinary skill in the art.

Modulation

Figure 2:
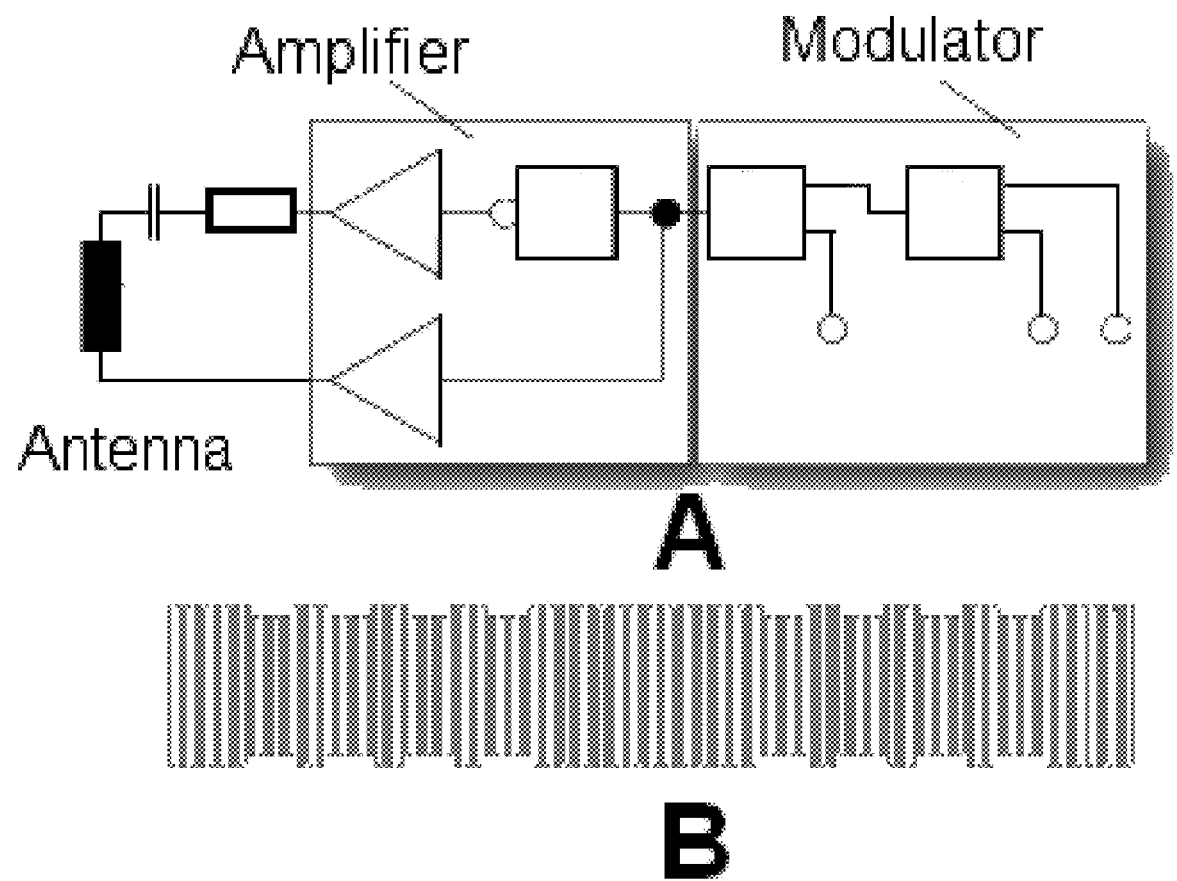
FIG. 2 shows a functional block diagram illustrating modulation of an RFID signal that may be employed in certain embodiments according to the current disclosure.

FIG. 2A shows a functional block diagram illustrating modulation of an RFID signal that may be employed in certain embodiments according to the current disclosure. Communication between a reader and an RFID tag may be through a mechanism called load modulation. A variation of the current in a tag's antenna (usually a coil) causes a small current variation in a reader's antenna due to mutual inductance between the two, and the variation is detected by the reader. The modulator provides for encoding the signal to be transmitted. An amplifier translates the modulator output to the antenna causing variations in the output signal from the antenna. These variations are expressed in FIG. 2B as discrete changes in signal strength. The RFID reader detects the signal variations and converts the signal to a form suitable for further processing.

One having skill in the art will recognize that specialized semiconductor devices are commercially available for providing the desired modulation. The modulator may be coupled to other sensors, which may affect the resulting modulation. In some embodiments the antenna provides for dual use in receiving an interrogation signal and providing the output resulting from that signal to the interrogator.

The tag's components may be enclosed within plastic, silicon, Teflon, glass or other biocompatible material.

Power Source

Figure 3:
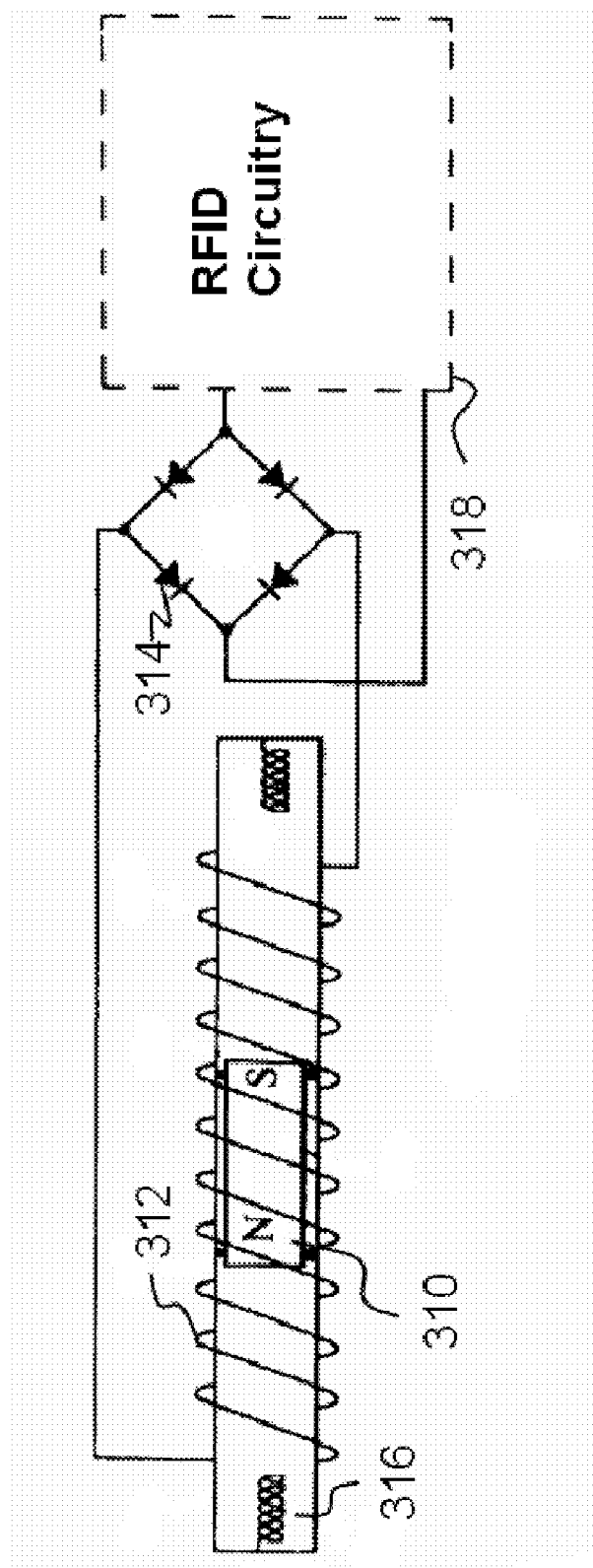
FIG. 3 shows an embodiment of certain aspects of an implantable RFID tag.

FIG. 3 shows an embodiment of certain aspects of an implantable RFID tag. In FIG. 3 power is generated using a form of linear induction generator. A magnet 310 (an electromagnetically active mass) is disposed inside the space formed by a coil of wire 312. The coil 312 is coupled to a rectifier 314 for producing a direct current which in turn is supplied to RFID circuitry 318. The magnet 310 is movable and thus slides inside the coil 312. In some embodiments springs 316 may be placed in a housing such that the magnet 310 is returned towards the center of the coil 312. Since a magnet moving axially through the center of a coil will induce a voltage across the coil terminals, a voltage is induced because it is the result of the changing magnetic flux on the coil. The exact amount of power derived from this system will depend on the characteristics of the coil and magnet and together with the amount of motion induced onto the system.

One having skill in the art will be familiar with standardized rules for designing magnetic induction systems using wire coils and magnets. These parameters include, but are not limited to the number of turns of the coil, the radius of the coil, the rate of movement of a magnet traversing in the center of the coil, the permeability of the core material and the inductance of the coil.

Some embodiments of an implantable RFID tag may employ magnetic induction generator coupled to a resonant circuit and an antenna. Series or parallel elements may be formed to create the resonant circuit. In operation, the resonant circuit may transmit a signal triggered when the magnetic induction generator provides sufficient power to cause the circuit to resonate. Motion of the generator may be intermittent such that an RF signal is broadcast only when motion is sufficient and the RF signal fades after the power is no longer being generated. In some embodiments such as these the output of the resonator circuit may be un-modulated, merely reflecting the results of the motion that induced the voltage. For example and without limitation, embodiments may not include a rectifier and the magnetic generator may supply unregulated power to an RC circuit capable of causing an antenna element to transmit a simple signal in response to movement of the magnetic generator.

In other embodiments, the magnetic generator comprising a biocompatible housing having a longitudinal axis, electrically conductive material engaged about at least of portion of the housing and extending along at least a portion of said longitudinal axis, an electromagnetically active mass positioned within said housing, said mass reciprocally movable along at least a portion of said longitudinal axis, a first spring having first and second ends, wherein one end is engaged with said housing and one end in engaged with said electromagnetically active mass, a second spring having first and second ends, wherein one end is engaged with said housing and one end is engaged with said electromagnetically active mass (not shown), and a means to mitigate motion retardation of said electromagnetically active mass within the housing may be effectuated by constructing the generator to reduce drag on the motion of the active mass.

It should be noted that the electrical energy generator may include a combination of two or more of ways of constraining the non-reciprocating movement of the electromagnetically active mass within the housing, means for mitigating motion retardation of the electromagnetically active mass within the housing, and at least one spring deflection adjustor. These may be effectuated by at evacuating at least a portion of the air within the housing to reduce drag on the electromagnetically active mass. Accordingly, some embodiments may be hermetically sealed. Some embodiments may include an electrically conductive material that is engaged about at least a portion of the exterior surface of the housing. Without limitation, the electrically conductive material may be provided in the form of an induction coil. The induction coil may include an armature, inductor, wire coil, or any other looped electrically conductive material.

One having skill in the art will recognize that power storage devices such as batteries, capacitors, and the like, may also be employed to collect and store generated power for use by an RFID circuit at a later time. For example and without limitation, a capacitor may hold charge until the RFID circuit is interrogated by an RFID reader, and then draw power from the capacitor for use in responding to the interrogation. Also, although described as having a moving electromagnetically active mass, certain embodiments may include a stationary electromagnetically active mass coupled to a moving coil or inductor.

The housing of the device may comprise any suitable structure, capsule, container, or vessel that is capable of engaging the other components and being compatible with biological activity. Accordingly, the housing may be constructed of any biocompatible material that can support the engagement of device components and that does not interfere with the generation of mechanical energy or conversion of the mechanical energy into electrical energy. Without limitation, suitable material that may be used to construct the housing of the device may comprise Teflon, titanium and certain biocompatible plastics such as polyether ether ketone (PEEK).

Certain embodiments may include at least one spring engaging the electromagnetically active mass to the housing. The springs generally have opposite first and second ends, and are engaged at one end with the housing and at the other end with the electromagnetically active mass. A spring is any component which produces a restorative force in response to its displacement.

Animal Motion

In certain embodiments an implantable RFID tag may be disposed on a portion of a living animal body. In these embodiments an RFID tag may comprise a power generation source including a magnetic induction generator coupled to a resonant circuit and an antenna. For example and without limitation, the generator may provide power to a resonant circuit and antenna such that the when the animal body moves the RFID tag transmits. Further, with the additional of a modulator, the RFID tag may transmit an encoded message at a frequency governed by the respondent circuit and antenna.

In operation when the living animal moves there will be an output from the RFID chip; while at rest, there will be no output from the RFID chip. Certain parts of a living body move even though the animal is at rest. For example and without limitation, involuntary muscles such as hearts and lungs may move. Accordingly some embodiments may place an RFID tag in a location such that the RFID tag transmits a signal in response to a heartbeat or breathing.

The motion of the heart surface is quasi-periodic in nature. The motion of any particular point of interest on a beating heart is primarily the superposition of two effects: motion due to the heart beating and motion due to breathing. Each of these signals closely resembles periodic signals and the transmission from the RFID chip may reflect this motion. For example and without limitation an RFID tag disposed on a human heart will transmit this complex signal periodically and may also reflect the cardiac cycle of the human.

The aorta, the largest artery in the body, is almost the diameter of a conventional garden hose. Moreover, the aorta flexibility varies with age and any possible disease conditions, and the volume of blood pumped per beat is also variable from individual to individual. The operation of the aorta has a wide range among a population. Accordingly some embodiments of an implantable RFID tag as disclosed herein, when disposed on an animal heart or aorta will transmit a signal which is characterized by the underlying muscle movement and information in that transmitted signal will reflect the nature of the movement. A strong, healthy person may have fewer, stronger heartbeats which increase in frequency, but decrease in strength as the person ages.

One having skill in the art will appreciate that several locations in a human body may be used for disposition of an implantable RFID tag. For example and without limitation the neck provides for access to the carotid artery, and the groin allows for access to the femoral artery.

One skilled in the art will also appreciate that power supplied by the magnetic generator may be used to power devices such as pacemakers and other electrically operated implant devices.

To dispose an implantable RFID tag in an animal may entail effectuating the RFID tag to be small enough to be minimally invasive. Installation may be performed endoscopically, surgically, or hypodermically depending on the desired result.

Additionally, the materials comprising the RFID tag would preferably be biocompatible. In some embodiments, disposition of the RFID tag may be performed by suturing the RFID in place. One having skill in the art will recognize that the use of a linear magnetic induction generator may provide for position dependent operation. For example and without limitation, an implantable RFID tag could be disposed in a human body so that when a person is erect, the magnet is drawn downward by gravity and the generator ceases to produce power, but when the person is prone, the affect of gravity does not draw down the magnet and animal motion will cause power production thus creating a signal.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed:

1. A method comprising:
   disposing a moveable ferromagnetic mass in a biocompatible housing,
      wherein the moveable ferromagnetic mass has a linear axis of operation;
   disposing an inductive loop proximate to the ferromagnetic mass;
   coupling the inductive loop to a resonator; and,
   disposing, using a means of anchoring, the biocompatible housing on a pulsating tissue, wherein the pulsating tissue pulsates in a quasi-sinusoidal rhythm, wherein the linear axis of operation is in an orientation substantially parallel to a normal vector of a surface of the pulsating tissue, wherein the resonator produces an electromagnetic field substantially proportional to the period and the amplitude of the quasi-sinusoidal rhythm of the pulsating tissue.

2. The method of claim 1 further including: coupling the resonator to an antenna.

3. The method of claim 1 further including: coupling a modulator to the resonator.

4. The method of claim 3 wherein the modulator is solid-state.

5. The method of claim 1 wherein the housing includes one or more of Teflon, titanium or polyether ether ketone.

6. The method of claim 1 wherein the pulsating tissue is at least one of either a heart, or an aorta, or a lung.

7. The method of claim 1 in which the means of anchoring is suturing.

8. The method of claim 1 in which at least a portion of the biocompatible housing is evacuated.

9. The method of claim 1 in at least a portion of the biocompatible housing is hermetically sealed.

10. The method of claim 1 wherein the pulsating tissue is part of an animal.

11. The method of claim 1 wherein the pulsating tissue is part of a human.

\* \* \* \* \*